Dec. 1, 1925.
A. H. FOX
1,563,477
INTERNAL COMBUSTION ENGINE
Filed Dec. 5, 1921
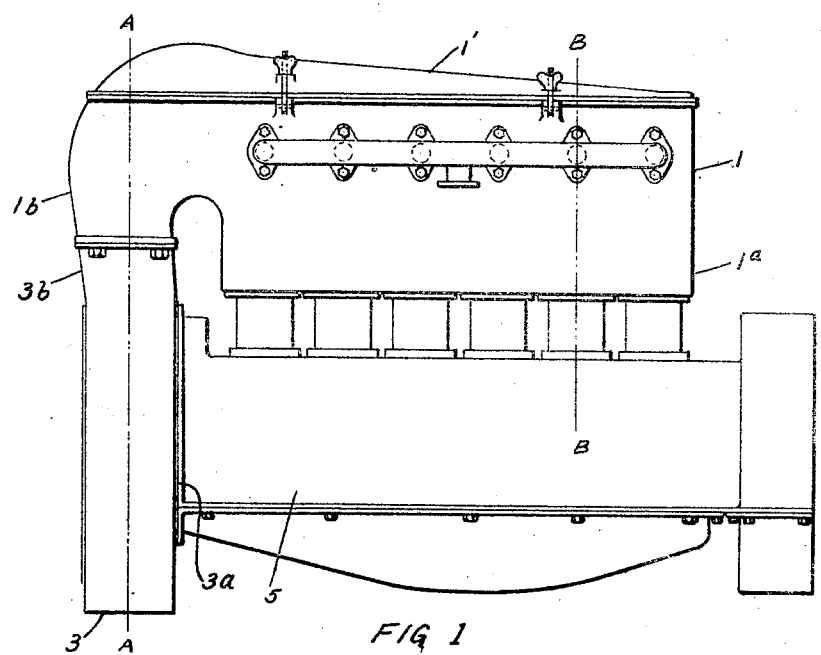
FIG 1
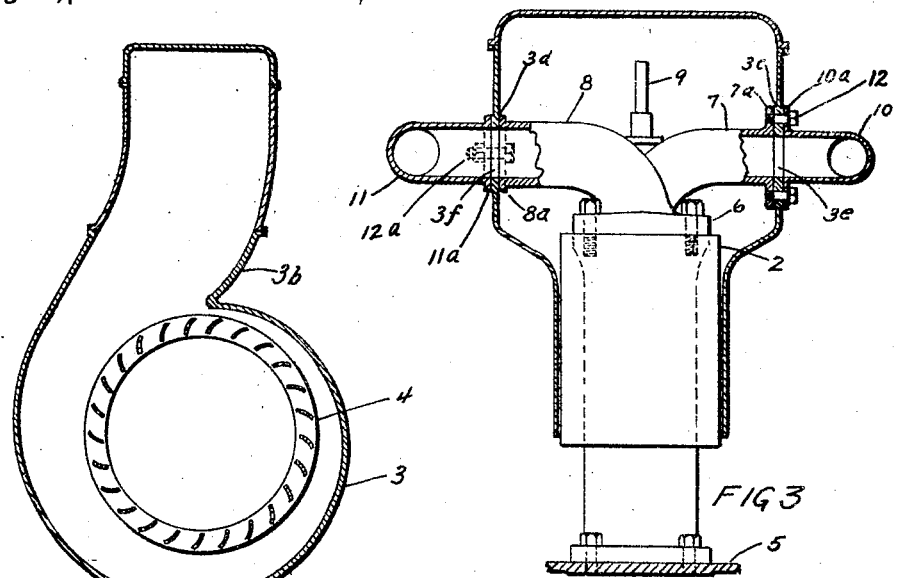
FIG 2
FIG 3
Ansley H. Fox.
Inventor
Butler & Denny
By Attorneys.

Patented Dec. 1, 1925.

1,563,477

UNITED STATES PATENT OFFICE.

ANSLEY H. FOX, OF PHILADELPHIA, PENNSYLVANIA, ASSIGNOR, BY MESNE ASSIGNMENTS, TO FOX HOLDING COMPANY, OF PHILADELPHIA, PENNSYLVANIA, A CORPORATION OF DELAWARE.

INTERNAL-COMBUSTION ENGINE.

Application filed December 5, 1921. Serial No. 519,962.

*To all whom it may concern:*

Be it known that I, ANSLEY H. FOX, a citizen of the United States, residing in the city of Philadelphia, county of Philadelphia, and State of Pennsylvania, have invented certain Improvements in Internal-Combustion Engines, of which the following is a specification.

This invention relates more particularly to internal combustion engines of the air cooled type, and it is designed primarily to provide improved means for combining the air duct with the intake and the exhaust manifolds.

The improvements are characterized, in the preferred construction, by an air duct fixed to the cylinder or cylinders so as to encase the head or heads, the ducts and the valve mechanisms thereof and by fixing the cylinder headducts and the manifolds together by flanges thereon between which the sides of the air duct are clamped to form air tight joints.

Desiderata attained by the improved construction are the provision of supporting means for the air duct, general rigidity and strength of construction, and simplicity and facility in assembling.

In the drawings, Fig. 1 is a side elevation of an engine equipped with the invention, Fig. 2 is a sectional view taken on the line A—A of Fig. 1, and Fig. 3 is an irregular sectional view taken on the line B—B of Fig. 1.

The invention, in the form thereof illustrated in the drawings, comprises the duct 1 having the skirt 1ª telescoped on, fixed to and encasing the tops of the cylinders 2, the duct having the removable cover 1', in combination with the scroll 3 for the fan 4, the scroll having its face 3ª fixed to an end of the crank case 5 and its neck 3ᵇ fixed in registering relation to the neck 1ᵇ of the duct 1.

The tops of the cylinders 2 and the cylinder heads 6, together with the intake and exhaust ports 7 and 8 and the valve mechanisms 9 connected therewith, are thus housed in the air duct, the ports being provided with the respective flanges 7ª and 8ª which engage the inner surfaces of the respective bearings 3ᶜ and 3ᵈ of the air duct surrounding the openings 3ᵉ and 3ᶠ therein, which register with the respective ports 7 and 8.

The intake and exhaust manifolds 10 and 11 are provided with the respective flanges 10ª and 11ª which engage the outer surfaces of the respective bearings 3ᶜ and 3ᵈ so that the passages of these manifolds register with the respective openings 3ᵉ and 3ᶠ.

Bolts 12 and 12ª pass through the respective flanges 10ª and 11ª, the corresponding bearings 3ᶜ and 3ᵈ, and the respective flanges 7ª and 8ª, by which the parts 7 and 10, and the parts 8 and 11 are firmly clamped against the corresponding sides of the air duct 1.

Thereby tight joints are formed between the air duct, ports and manifolds, the parts are fixed together to provide a sturdy construction with a thoroughly braced air duct housing. More or less of the cylinders, as well as the cylinder heads and their immediate connections, are encased. The structure can be assembled readily and the parts fixed together from the outside.

Having described my invention, I claim:—

1. In an internal combustion engine, the combination with a plurality of cylinders having ducts connected with the heads thereof, and manifolds connected with the ducts, of an air duct encasing said cylinder heads and ducts first mentioned, said air duct having its sides fixed between and supported by said ducts and manifolds.

2. In an internal combustion engine, the combination with the cylinders, of an air duct encasing the heads of the cylinders and having openings therein, intake and exhaust ducts fixed to said heads and provided with flanges fixed to the interior of said air duct around said openings, and intake and exhaust manifolds having flanges fixed to said air duct around said openings.

3. In an internal combustion engine, the combination with the cylinders and the cylinder heads having intake and exhaust ducts, of flanges on the outer ends of said ducts, an air duct telescoped on and fixed to said cylinders so as to encase the tops thereof together with said cylinder heads and ducts, intake and exhaust manifolds having flanges thereon, sides of said air duct being engaged between the flanges of said ducts and manifolds and having openings therein through which said ducts and manifolds communicate, and bolts whereby the flanges of said ducts and manifolds are clamped to said sides of said air duct, 4. In a internal combustion engine, the combination with a plurality of cylinders having intake and exhaust ducts connected with the heads thereof and extending to opposite sides of said cylinders, of a casing providing an air chamber above said cylinders and ducts, the walls of said casing being engaged and supported by said ducts, and manifolds on opposite sides of said casing and connected with said intake and exhaust ducts through apertures in said casing.

Signed at Philadelphia, in the county of Philadelphia and State of Pennsylvania, this 30th day of November, 1921.

ANSLEY H. FOX.